INVENTORS
EMILE LABIN
DONALD D. GRIEG
BY Paul R. Adams
ATTORNEY

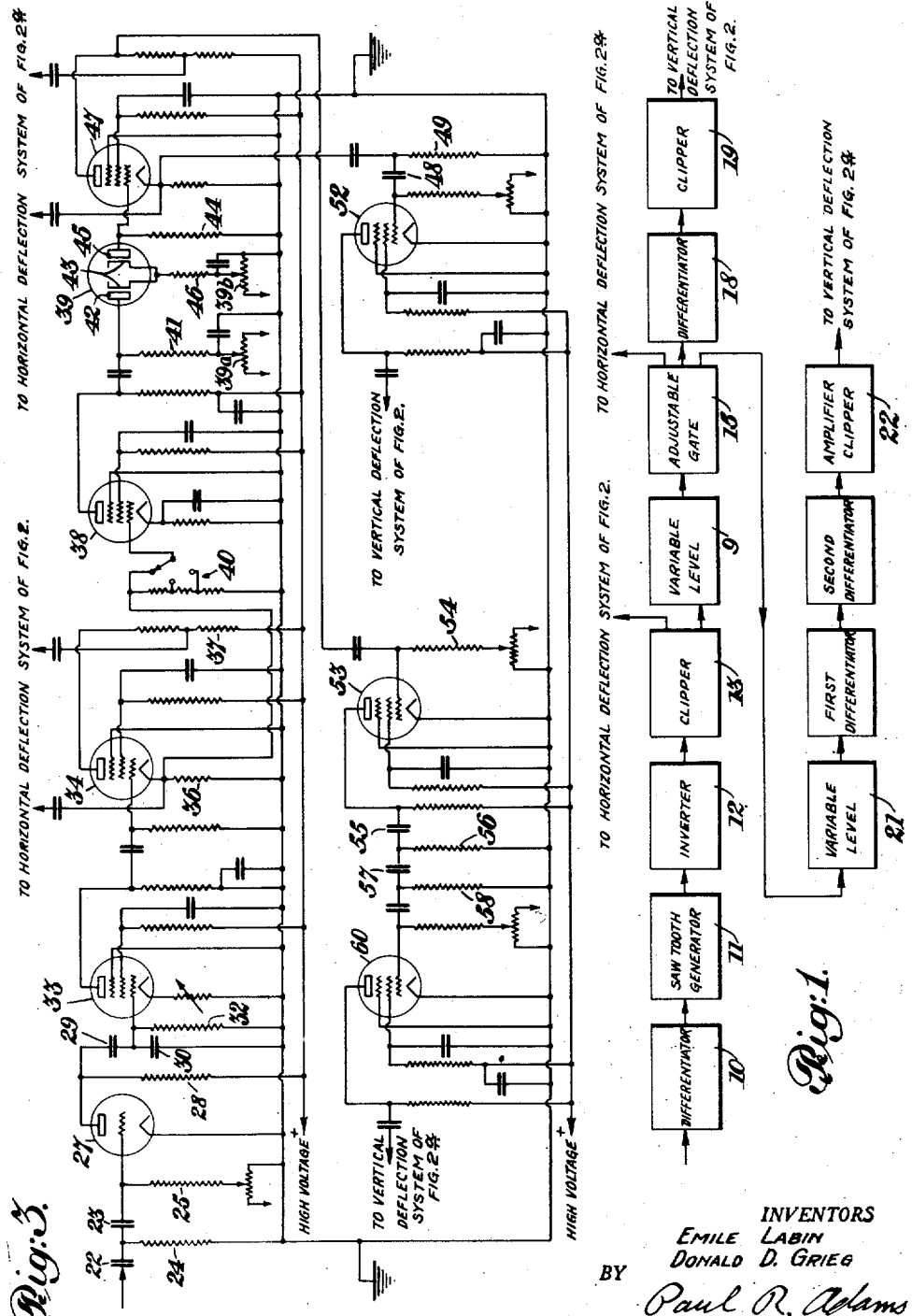

United States Patent Office 2,802,179
Patented Aug. 6, 1957

2,802,179

INDICATING AND CALIBRATING MEANS

Emile Labin and Donald D. Grieg, New York, N. Y., assignors to International Telephone and Telegraph Corporation, a corporation of Maryland Application April 3, 1942, Serial No. 437,530

11 Claims. (Cl. 324—68)

This invention relates to radio means for obstacle detection and more particularly to applications of such systems to the detection of hostile aircraft or ships. Systems of this kind have been disclosed in the co-pending applications of H. Busignies, Serial No. 417,151, filed October 30, 1941, now abandoned, and E. Labin, Serial No. 433,762, filed March 7, 1942, now Patent No. 2,419,566, dated April 19, 1947, and in French Patent No. 853,994. These systems disclose methods of detecting the locations of obstacles by identifying their distance and direction with respect to the locating apparatus; and they operate according to the so-called pulse-modulation principle, wherein very brief trains of ultra high frequency waves are intermittently radiated, and the echo of such radiation is examined by the apparatus to locate the object.

It is an object of this invention to provide an improved indicating system for use in apparatus of the above nature.

Another object is to provide a circuit of this kind permitting a "vernier" observation of distances to reflecting objects.

It is also an object to provide improved means for calibrating distance in devices of the above nature.

A more specific object is to provide an improved means for applying to the deflection system of the cathode ray tube recurring sweep potentials whose sweeping action occupies only a fraction of a recurrence interval.

A further specific object is to provide an improved means for applying to the deflection system of the cathode ray tube sweep potentials whose sweeping action is of adjustably controllable duration with respect to the recurrence interval and at the same time to maintain the maximum potential of these magnitudes substantially constant.

A still more specific object is to provide in connection with the above indicated sweep potential generating means, means for adjustably selecting the position of the interval of time during which said sweep potentials are applied to the cathode ray tube so as to be earlier or later with respect to the total recurrence interval.

Other object and various further features of novelty and invention will hereinafter be pointed out or will occur to those skilled in the art from a reading of the following specification in connection with the drawings included herewith. In said drawings—

Fig. 1 is a block diagram illustrating features of the invention;

Fig. 3 is a detailed schematic circuit diagram for performing the functions indicated in the block diagrams of Fig. 1;

Figure 4:
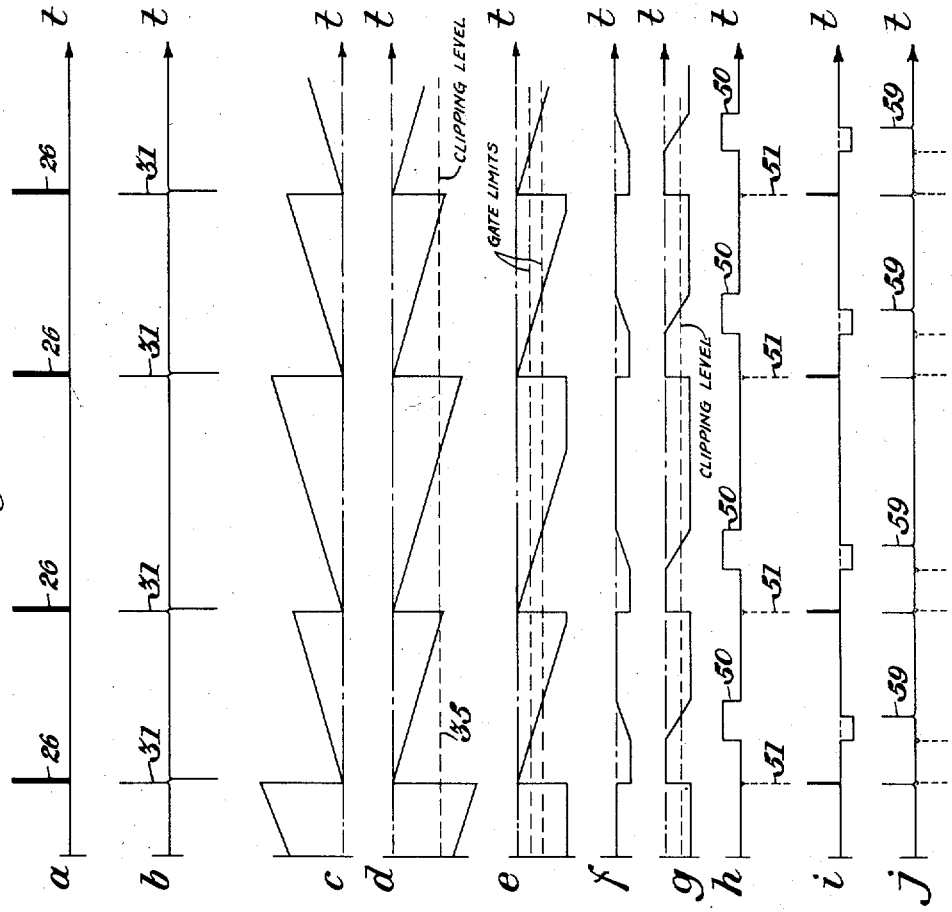

Curves $a, b, c, \ldots j$ of Fig. 4 are graphical representations of voltage conditions throughout the circuit of Fig. 3;

Since the present invention relates essentially to an improved indicating system for use in radio locating devices of the above nature, the transmitting and receiving apparatus need not be considered in detail in view of the fact that such systems are known. The invention is suitable for use in connection with radio location devices employing either regularly or irregularly recurrent transmission of brief wave trains of ultra-high-frequency energy. Suitable apparatus for transmission in the latter manner is disclosed in said co-pending application of E. Labin, Serial No. 433,762, filed March 7, 1942. According to the method disclosed in this application, an inductance is allowed to charge and then suddenly discharge, of its own accord, and the discharge current is made to modulate an ultra-high-frequency carrier. It is clear that when such a system is allowed to run wild, that is, run free of any synchronization, impulses thus produced recur somewhat irregularly.

Since the transmitted wave trains may not be regularly recurrent, we consider it desirable to relate to each transmitted wave train that part of the receiving apparatus which calibrates total distance travelled by the received reflected wave trains. Accordingly, in a preferred embodiment, the indication circuit shown in Fig. 1 is primarily controlled by a signal proportional to current in the pulse transmitter which as above indicated is used for modulating wave trains for transmission. In this manner, operation of the indicator circuit is always related to the instants of beginning to transmit wave trains. In the form shown in Fig. 1, this primary control potential is derived from the discharging current in the inductance of the pulse generator. The voltage applied to the input of the circuit of Fig. 1 is thus generally of the form shown in curve $a$ of Fig. 4.

By applying this control potential to a differentiator network 10, there is obtained for each leading edge of a control impulse 26 (curve $a$), a relatively sharply defined impulse 31 due to the steep slope of the control potential at its leading edge. Since this sharp impulse corresponds with the instant of fastest increase in discharge voltage of the pulse generator inductance, it is, accordingly, coincidental with the leading edge of the transmitted wave train. Impulse 31 thus forms an accurate time-origin defining means and it is therefore used each time it recurs, to generate a fresh saw-tooth wave by means of saw-tooth generator 11. Saw-tooth generator 11 is preferably so designed that each fresh saw-tooth commences at the same potential for reasons that will later become apparent. Due to the fact that the wave trains are transmitted irregularly, it is clear that successive saw-teeth will rise to various different magnitudes because of the correspondingly different charging time permitted in each instant. In order that these variously sized saw-teeth will be substantially ineffective to produce an alternating-current axis, thereby changing the level at which each fresh saw-tooth commences, we pass the saw-teeth through an inverter 12 and clip off all saw-teeth voltages above a predetermined limit by means of a clipper 13. The output from clipper 13, it is clear, will be characterized by a gradually increasing signal immediately following each transmitted wave train, said signal always rising to a fixed magnitude in the same interval of time for each recurrence of such rise and then remaining at said fixed magnitude for the remainder of the recurrence interval (i. e. until the next pulse comes from differentiator 10). Thus, the output of clipper 13 is suitable for application to, say, the horizontal deflection system of a first cathode ray indicating tube in order thereby to define a distance indicating axis. It is clear that when a wave train, as reflected by a reflecting object, returns to the locating apparatus, a certain amount of time indicative of distance to the object will have elapsed. After the reflected wave train is suitably detected and amplified as in the manner indicated in the above co-pending applications and applied to the other deflection system of the same cathode ray tube, an indication transverse to the "distance" axis will appear to intersect the same at a point therealong indicative of the distance to the reflecting body. The face of this first cathode ray tube is shown in Fig. 2, and an indication such as would be obtained from a reflecting object is the vertical deflection 14, which appears to locate a reflecting object about 70 miles away (for the distance axis shown).

When the sweep potentials as supplied by clipper 13 are made to cover the entire range of the apparatus, say, distances of the order of 150 or 200 miles, it is clear that precise distances are not resolvable on such a distance scale. Thus, in the case shown in Fig. 2, it is difficult to tell with any degree of accuracy whether the reflecting object causing deflection 14 is 68 or 73 miles away. Furthermore, due to the fact that a wave train such as would be transmitted by the locator apparatus is on the order of two microseconds duration, and the sweep time for a 160 mile distance scale is on the order of 1730 microseconds, the viewing screen resolving power of the cathode ray indicator will have to be one in about 850— which, due to known blurring effects of fluorescence, will not be obtainable with a single cathode ray tube of current design. It will, accordingly, be impossible to tell on the screen of the cathode ray shown in Fig. 2 whether or not deflection 14 is indicative of one airplane or a whole closely packed squadron. We propose, therefore, in accordance with the invention to employ an additional cathode ray tube, the screen of which is shown in Fig. 2a, more closely to analyze the distance field within desired limits in the neighborhood of the reflecting object or objects causing deflection 14. Apparatus for performing this function will be described more particularly below, but in brief, it comprises a device 9 for adjustably controlling the magnitude of output from clipper 13, and a gate circuit for clipping and limiting output from network 9 within a voltage region having adjustably controllable limits but having a fixed interval between such limits. Gate 15 thus performs the function of deriving from the sweep potentials used for the distance scale of the cathode ray tube of Fig. 2, sweep potentials of fixed amplitude fluctuation but adjustably controllable as to the length and position of their sweeping interval, whereby this time interval (and thus effectively magnified distance range) may fill the full scale of the cathode ray tube of Fig. 2a.

Figure 2:
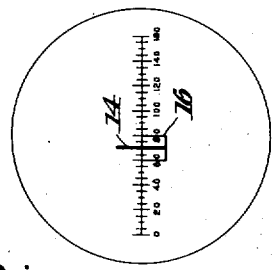
Figs. 2 and 2a represent the screen of two cathode ray tubes for use in connection with the circuit of Fig. 1.
Figure 2A:
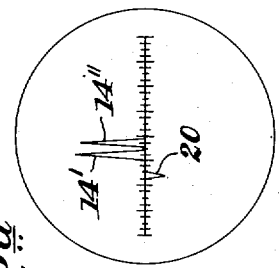

In accordance with a further feature of the invention, means responsive to the sweep signals applied to the cathode ray tube of Fig. 2a are provided for making a marker 16 on the screen of the cathode ray tube of Fig. 2, which marker is indicative of the range more closely being observed on the cathode ray tube of Fig. 2a. This apparatus simply comprises a differentiating network 18 and clipper 19 for generating square waves recurrent for each sweep operation of the cathode ray tube of Fig. 2a and of a duration equal to the time of the sweep.

In accordance with a still further feature of the invention, means are provided for generating an additional impulse to be applied to the vertical deflection system of the cathode ray of Fig. 2a. This impulse may be made to occur at an adjustably controllable time after each transmitted wave train. By suitable manual adjustment of this latter means, the additional indication 20 caused thereby on the cathode ray tube of Fig. 2a may be made to coincide in time with the indication corresponding to the reflecting body. The amount of adjustment necessary so effectively to superimpose indication 20 on the indication of the reflection will be indicated precisely, as by a dial reading of the exact distance to the reflecting object. In order to make sure that this additionally supplied calibrating impulse will occur within the sweep interval for the cathode ray tube of Fig. 2a the distance axis sweep potentials for this cathode ray tube are first supplied to an adjustably controllable amplitude regulating device 21 whereafter two differentiation operations are performed, and undesired portions of the resultant output are appropriately clipped by amplifier 22.

Turning to a more specific consideration of the circuit for performing the above generally indicated functions, reference is made to Fig. 3 and the curves of Fig. 4. In this circuit, the control signal, as derived from the discharge voltage for the pulse generator inductance, passes through a suitable coupling circuit 22 to a differentiator network comprising a series capacitance 23 and shunt resistance 24. As before noted, the effect of this differentiation is to supply across resistor 25, a series of relatively short and sharply defined impulses 31 of one polarity sense (see curve $b$ of Fig. 4), corresponding to the leading edge of the transmitted wave trains, and another such series in opposite polarity sense, corresponding to the trailing edge of the transmitted wave trains. This recurrent signal is used to start a fresh saw-tooth for each instant of recurrence. For this purpose, the saw-tooth generator comprises a triode 27 having in its output circuit a parallel resistance-capacitance arrangement 28, 29, 30, with a suitable time constant so that saw-tooth waves generated thereby have a substantially linear rate of change for the portion thereof that is used. By suitably biasing the grid of tube 27 negatively, only the portion of the output signal from the differentiator represented by pulses 31 may be made to occur above the cut-off potential for that tube, and each such pulse will control tube 27 momentarily to conduct and thus to discharge whatever voltage has built up across condensers 29, 30. In this manner, a relatively accurate timing may be effected for the start of each fresh saw-tooth, as will be clear.

In order that each saw-tooth may start from the same potential, output from the saw-tooth generating circuit is taken across only a portion of the capacitance voltage dividing arrangement 29, 30 in the output of tube 27, for reasons stated in the co-pending application of D. Grieg, Serial No. 435,498, filed March 20, 1942, now Patent No. 2,419,546, dated April 29, 1947. As explained in the said application, if the impedance of condenser 29 is relatively great with respect to that of condenser 30, and further, if coupling resistance 32 is of sufficiently high magnitude, output taken only across condenser 30 as shown will be characterized by each new saw-tooth starting from the same voltage magnitude. This effect is due to the fact that the time constant of the resistance-capacitance circuit 32 is then sufficiently large to prevent the output of the saw-tooth generator assuming an A.-C. floating axis. Output of the saw-tooth generator as it appears across resistor 32 will then be of the form shown in curve $c$ of Fig. 4, wherein it will be noted that each successive saw-tooth is characterized by the same rate of build-up and by a start from the same voltage reference level.

As above indicated, it is preferable as further insurance against the saw-tooth waves subsequently assuming an A.-C. axis, that these saw-teeth be clipped above a predetermined magnitude. The voltage across resistor 32 is accordingly applied to the control grid of an inverter pentode 33 to yield a signal of the form shown in curve $d$ of Fig. 4 whereafter it is supplied to another pentode 34 suitably biased for clipping, say, at the level 35 shown in curve $d$ in dotted lines. Clipper 34 preferably also operates as a grid-leak detector, whereby the corners of the saw-tooth signal corresponding to commencement of each saw-tooth are effectively lined up to the same voltage level, as further assurance that this desired condition will be present. As above stated, the resultant clipped signal shown in full lines on curve $e$ is suitable for application of sweep potentials to the first cathode ray indicator tube shown in Fig. 2. Output for controlling this sweep is taken symmetrically from the circuits of tube 34. Thus, one output connection is taken from a resistance 36 in the cathode circuit of tube 34, and the other output connection is taken across resistance 37 (preferably of the same magnitude as resistance 36) in the anode circuit of tube 34.

In generating sweep potentials for the cathode ray tube of Fig. 2a, use is made of a variable gain amplifier device 38 and a series diode double limiter 39. Control signals therefor are obtained across resistor 36 and appear across potentiometer 40, which is adjustable in steps, for purposes of varying the gain of tube 38. The voltage output of amplifier 38 is thus of the same general form as supplied to scan the screen of the cathode ray tube of Fig. 2 but the magnitude of overall voltage change thereof is variously different, depending upon the tap setting of potentiometer 40. Since this overall voltage change may thus be adjustable controllable, it follows that the slope or rate of change of the voltage will vary. Voltage signals having this adjustable slope character, are thus made to appear across a resistor 41 in the input circuit of the series diode limiter 39.

The circuit connections for tube 39 include means such as potentiometer 39a for applying bias of desired positive or negative magnitude to the anode 42 in the input circuit, means such as potentiometer 39b for applying an adjustably controllable negative bias to the cathodes 43 of each discharge path of device 39 and a load resistor 44 in the output circuit, that is between anode 45 and ground. Operation of such a device is substantially as follows, assuming that the applied saw-tooth signal is substantially symmetrical about a zero voltage axis, and that anode 42 is biased with respect to cathodes 43 an amount so as to permit the space discharge path between these elements to conduct for only a portion of the voltage swing of the applied signal. The effect of these conditions is well-known to be of a limiting or clipping nature and this clipped signal will appear across the biasing resistor 46 for cathodes 43, as will be clear. However, inasmuch as cathodes 43 are normally biased negatively, there is a normal conductive path provided between electrode 43 and anode 45. It follows that the signal appearing across resistor 46 will be conducted through the second discharge path (that is, from cathodes 43 to anode 45) as long as the magnitude of this voltage is less than the anode potential, whereafter a second limiting effect is produced.

This double limiting action is shown graphically in curve e of Fig. 4 wherein the two limiting actions defining a gate are shown in dotted lines. Output appearing across resistor 44 is thus of the general form shown in curve f. It will be observed that the effect of double limiter 39 has been to select only a portion of the voltage rise of the original saw-tooth wave. By varying the amount of the negative bias applied from potentiometer 39b to cathodes 43 the spread of the "gate" (i. e. the total voltage swing of the portion of the saw-tooth voltage that appears across resistor 44) may be adjustably selected. It is to be noted that an adjustment of this bias will always vary only the spread of the gate limits shown, but will not vary the upper limit of the gate. If it is desired to change the effective position of the gate, an adjustment of potentiometer 39a causing a change in the bias of anode 42 will serve this purpose without changing the spread of the gate.

In accordance with a feature of the invention, we employ voltage output from the series diode limiter 39 as a sweep potential for the horizontal deflection system of the cathode ray tube of Fig. 2a. In this manner, sweep potentials are applied for any given interval occuring within the sweep interval for the horizontal deflection system of the cathode ray tube of Fig. 2. It is to be noted that no matter what interval is selected, the actual voltage magnitudes defining the applied sweep voltage are always the same. This condition with regard to sweep voltages holds even for changes of slope of the saw-tooth as caused by various amplifications in tube 38, inasmuch as output from this tube is passed through the double diode limiting arrangement 39. Again in order not to set up an A.-C. axis, sweep potentials for the horizontal deflection system of the cathode ray tube of Fig. 2a are derived from a grid-leak-detector tube 47. It is thus clear that only one adjustment of cathode bias by means of potentiometer 39b will be necessary for a particular cathode ray tube for the Fig. 2a indications. No matter what the variation of amplification in tube 38, or the bias fed through resistor 41, or the irregularity of sweeping action in the cathode ray tube of Fig. 2, once the bias fed through resistor 46 has been properly set, the "vernier" sweep on the tube of Fig. 2a will produce a constant magnitude "distance scale" trace in the same position on the viewing screen thereof.

As generally explained above, we provide in accordance with the invention, a marker indication 16 on the screen of the cathode ray tube of Fig. 2 always to show generally the distance range which is being observed on the vernier oscilloscope of Fig. 2a. In the form shown, a signal for producing this indication is derived from the output of tube 47 by applying this output through a differentiator circuit comprising a series capacitance 48 and shunt resistance 49 alternately to produce square waves 50 and sharp negative pulses 51, as shown in curve h of Fig. 4. Since the square waves 50 form the only desired portion of the differentiated signal, the latter is applied to a clipper 52 having sufficient bias to cut out the negative pulses 51. It is clear that the width of the pulses 50 exactly defines the duration of the sweep potentials applied to the horizontal deflection plates of the oscilloscope of Fig. 2a. Accordingly, output of clipper 52 may be directly applied to the vertical deflection system of the oscilloscope of Fig. 2 so as to cause the presence of marker 16.

As also explained above, an additional marker 20 for the vernier oscilloscope is also generated from the output signal in tube 47. In the form shown, this additional marker is obtained by feeding output of tube 47 to a clipper 53 having adjustably controllable biasing means 54 for the control grid thereof. In this manner, the sweep potentials for the vernier oscilloscope are variously clipped as shown by the dotted line in curve g of Fig. 4. This clipped signal is then passed through a first differentiating network comprising a series capacitance 55 and shunt resistance 56 to yield a voltage form of the nature shown in curve i, and then through a second differentiating network comprising a series capacitance 57 and shunt resistance 58 to yield a voltage form substantially as shown in curve j. It will be noted that in this process, a series of sharply defined short impulses 59 has been generated to correspond with the instant at which the sweep potential for the vernier oscilloscope is clipped, as shown in curve g. All of the impulses 59 are of the same polarity. Other impulses present in the output of the second differentiating network are undesired (although they will not occur on the viewed portion of the distance scale of the vernier oscilloscope) and some of them are therefore eliminated by another clipper 60. It will be noted that even after such clipping action, further sharp impulses occur along with the desired ones 59, but that these further impulses represent the instant of time at which wave trains are transmitted by the locating apparatus and, hence, an instant of time which will never be under observation. Accordingly, these impulses will appear to one side of the distance scale, if at all.

In normal operation of the device described, the oscilloscope of Fig. 2 will be the only portion of the indicating equipment that need be observed, inasmuch as it views the entire range of the apparatus. When a reflecting object within range is noted, as by the appearance of indication 14, the operator should so vary the amount of bias applied to the anode 42 of the double diode limiter 39 until the marker 16 appears somewhat symmetrically to straddle the observed indication 14, adjusting potentiometer 40 to make marker 16 so narrow as to give the desired magnification. Attention may then be turned to the vernier oscilloscope, upon which the nature of the deflection potentials causing indication 14 may be more closely observed, due to the fact that sweep time for the vernier oscilloscope represents but a fraction of the full range of the apparatus. Thus, it may appear that what seemed to be a single indication 14 on the full range oscilloscope is in fact two reflections closely adjacent one another as indicated on the oscilloscope of Fig. 2a by the two markings 14′ and 14″. The operator knows from the degree of adjustment required to produce marker 16 so as the straddle indication 14 that the distance scale on the vernier oscilloscope has an origin corresponding to a known observed distance. In order to find the additional distance to the reflecting objects, another control dial or other device is manipulated so as to adjust the bias on clipper 53, thereby effectively moving the fine marker 20 along the distance scale of the vernier oscilloscope. When this fine marker is observed to be concurrent with one of the indications 14′ and 14″ (as when a noticeable change in the peak amplitude of the latter is observed), all that need be done is to read off (in distance units, when suitably calibrated) the actual adjustment made in the bias for clipper 53 and add this value to that represented by the adjustment of the bias on the anode 42 of limiter 39, as will be clear.

It is apparent that we have thus far described a relatively simple arrangement for indicating the presence of reflecting bodies within a relatively wide range of observation. The invention makes it possible always to observe the entire range of the apparatus and, when desired, to investigate with a high degree of accuracy any desired limited region within the said range. The invention further makes it possible to know within relatively small limits, the remoteness of a reflecting body, provided the latter is within range of the apparatus.

While the invention has been described in detail in particular connection with the preferred forms illustrated, it is to be understood that many modifications, additions and omissions may be made within its scope as defined by the appended claims.

What is claimed is:

1. A device for use in indicating the interval of time between a first and a second relatively short impulse, comprising a first and a second oscilloscope each having two deflection systems, saw-tooth generating means responsive to said first impulse to commence a saw-tooth at substantially the instant of occurrence of said first impulse, means coupling said saw-tooth generating means to one deflection system of said first oscilloscope, means supplying a potential indicative of said second impulse to the second deflection system of said first oscilloscope, gate means coupled to said saw-tooth generating means for effectively selecting a portion of the saw-tooth generated thereby, means coupling the output of said gate means to a deflection system of said second oscilloscope and means supplying a potential indicative of said second impulse to the other deflection system of said second oscilloscope.

2. A device for use in indicating the interval of time between a first and a second relatively short impulse, comprising a first and a second oscilloscope each having two deflection systems, saw-tooth generating means responsive to said first impulse to commence a saw-tooth at substantially the instant of occurrence of said first impulse, means coupling said saw-tooth generating means to one deflection system of said first oscilloscope, means supplying a potential indicative of said second impulse to the second deflection system of said first oscilloscope, gate means coupled to said saw-tooth generating means for selecting a portion of the saw-tooth generated thereby, means supplying potential responsive to the output of said gate means to said second deflection system of said first oscilloscope, means coupling the output of said gate means to a deflection system of said second oscilloscope and means supplying a potential indicative of said second impulse to the second deflection system of said second oscilloscope.

3. A device for use in indicating the interval of time between a first and a second relatively short impulse, comprising a first and a second oscilloscope each having two deflection systems, saw-tooth generating means responsive to said first impulse to commence a saw-tooth at substantially the instant of occurrence of said first impulse, means coupling said saw-tooth generating means to one deflection system of said first oscilloscope, means supplying a potential indicative of said second impulse to the second deflection system of said first oscilloscope, gate means coupled to said saw-tooth generating means for effectively selecting a portion of the saw-tooth generated thereby, means coupling the output of said gate means to a deflection system of said second oscilloscope, means supplying a potential indicative of said second impulse to the other deflection system of said second oscilloscope, adjustably controllable means generating a further relatively short impulse at an adjustably controllable time after said first impulse, and means supplying a potential indicative of said further impulse to said other deflection system of said second oscilloscope.

4. A device for use in indicating the interval of time between a first and a second relatively short impulse, comprising a first and a second oscilloscope each having two deflection systems, saw-tooth generating means responsive to said first impulse to commence a saw-tooth at substantially the instant of occurrence of said first impulse, means coupling said saw-tooth generating means to one deflection system of said first oscilloscope, means supplying a potential indicative of said second impulse to the second deflection system of said first oscilloscope, gate means coupled to said saw-tooth generating means for effectively selecting a portion of the saw-tooth generated thereby, means supplying a potential responsive to the output of said gate means to said other deflection system of said first oscilloscope, means coupling the output of said gate means to a deflection system of said second oscilloscope, means supplying a potential indicative of said second impulse to the other deflection system of said second oscilloscope, adjustably controllable means generating a further relatively short impulse at an adjustably controllable time after said first impulse, and means supplying a potential indicative of said further impulse to said other deflection system of said second oscilloscope.

5. A device comprising first and second cathode ray oscilloscopes, means to generate a sweep potential for the first oscilloscope, means to generate a sweep potential for the second oscilloscope the time interval of which corresponds to a part of the sweep of the first oscilloscope, means to control the timing of the sweep of the second oscilloscope relative to the sweep of the first oscilloscope, means to differentiate energy of the sweep potential of said second oscilloscope thereby producing a substantially rectangular pulse having a corresponding duration, and means to apply the rectangular pulse to a deflection circuit of the first oscilloscope to produce a deviation of said duration in the trace line thereof whereby a marker on the first oscilloscope is provided.

6. An electrical circuit for generating a constant magnitude voltage having an adjustably controllable substantially linear rate of change comprising means to generate a saw-tooth voltage, means for adjustably varying the magnitude of the saw-tooth voltage, and a gate device for clipping and limiting the saw-tooth voltage between two selectable voltage levels thereby defining gate limits for passage of energy of said saw-tooth voltage, said gate means having two controls one for varying the spread between said two levels without changing the position of the gate with respect to said saw-tooth voltage and the other for varying the position of the two levels with respect to the saw-tooth voltage without varying the spread of said two levels.

7. The electrical circuit defined in claim 6 wherein said gate device includes vacuum tube means having two sets of electrodes, each said set including a cathode and an anode, means connecting together the cathode electrodes of the two sets, a supply of biasing potential for the electrodes, the control means for controlling the spread between said voltage levels being arranged to adjustably control the supply of potential to said cathode electrodes, and the control means for determining the position of the two levels on said saw-tooth voltage being arranged to adjustably control the supply of potential to at least one of the anode electrodes.

8. A gate device for clipping and limiting an electrical wave between two predetermined voltage levels comprising vacuum tube means providing two sets of electrodes, each said set including an electron emitting electrode and an electron collecting electrode, means connecting one electrode of one set to the like operating electrode of the other set, a supply of biasing potential for said electrodes, control means to adjustably control the supply of potential to the two electrodes connected together, and control means to adjustably control the supply of potential to at least one of the other electrodes, the adjustment of one of the control means operating to control the spread of said voltage levels without changing the position of the gate defined thereby with respect to said electrical wave and the adjustment of the other control means operating to determine the position of the voltage levels on said electrical wave without varying the spread of said two levels.

9. A gate device for clipping and limiting an electrical wave between two predetermined voltage levels comprising a vacuum tube having two sets of electrodes, each said set including a cathode and an anode, means connecting together the cathode electrodes, a supply of biasing potential for said electrodes, control means to adjustably control the supply of potential to said cathodes to control the spread of said voltage levels, and means to adjustably control the supply of potential to one of the anode electrodes to determine the position of the two voltage levels on said electrical wave.

10. A system for measuring recurrent substantially equal time intervals, said system comprising means to establish a reference potential, means to establish a variable comparison potential varying through a range of potentials including the reference potential at a predetermined time rate, means to select the initial potential of said range of potential variation, means to start the said potential variation simultaneously with the start of each recurrent time interval, and means to compare the instantaneous value of the said variable potential with the reference potential at the end of each said time interval, whereby the selected initial potential may be varied until the potential variation of said source of variable potential during the interval to be measured is equal to the potential difference between the selected initial potential and the reference potential.

11. A system for measuring recurrent substantially equal time intervals, said system comprising a source of reference potential, a source of variable potential, the amount of which may be varied repeatedly from an arbitrary initial potential at a predetermined time rate through a range of potentials including the potential of said reference, means to select the value of the initial potential of said source of variable potential, means to control the potential variation of said source to start simultaneously with the beginning of each said time interval, means for comparing the instantaneous potential of said source of variable potential with the said reference potential, means to actuate said comparing means at the finish of each said interval, whereby the potential variation of said source of variable potentials during the interval to be measured may be made equal to the potential difference between the selected initial potential and the reference potential.

References Cited in the file of this patent
UNITED STATES PATENTS

| | | |
|---|---|---|
| 2,088,495 | Swedlund | July 27, 1937 |
| 2,144,779 | Schlesinger | Jan. 24, 1939 |
| 2,207,048 | Campbell | July 9, 1940 |
| 2,230,926 | Bingley | Feb. 4, 1941 |
| 2,248,267 | Bacon | July 8, 1941 |
| 2,281,395 | Travis | Apr. 28, 1942 |
| 2,324,275 | Becker | July 13, 1943 |
| 2,355,363 | Christaldi | Aug. 8, 1944 |